US008731084B2

(12) United States Patent
Kondo

(10) Patent No.: US 8,731,084 B2
(45) Date of Patent: May 20, 2014

(54) MULTI-CARRIER COMMUNICATION APPARATUS

(71) Applicant: Fujitsu Semiconductor Limited, Yokohama (JP)

(72) Inventor: Taiji Kondo, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 0 days.

(21) Appl. No.: 13/860,372

(22) Filed: Apr. 10, 2013

(65) Prior Publication Data

US 2013/0223546 A1   Aug. 29, 2013

Related U.S. Application Data

(60) Division of application No. 12/554,201, filed on Sep. 4, 2009, now Pat. No. 8,442,147, which is a continuation of application No. PCT/JP2007/000218, filed on Mar. 13, 2007.

(51) Int. Cl.
*H04K 1/10*   (2006.01)

(52) U.S. Cl.
USPC ............ 375/260; 375/267; 375/299; 375/324

(58) Field of Classification Search
USPC ........................................................ 375/260
See application file for complete search history.

(56) References Cited

U.S. PATENT DOCUMENTS

| | | | |
|---|---|---|---|
| 5,226,083 A * | 7/1993 | Taguchi | ......................... 704/219 |
| 5,920,598 A | 7/1999 | Hyakudai et al. | |
| 7,009,932 B2 * | 3/2006 | Matheus et al. | ............. 370/208 |
| 2002/0016807 A1 | 2/2002 | Takaoka et al. | |
| 2006/0215603 A1 | 9/2006 | Nishio et al. | |
| 2006/0233112 A1 | 10/2006 | Demmerle | |

FOREIGN PATENT DOCUMENTS

| | | |
|---|---|---|
| EP | 0 876 025 A1 | 11/1998 |
| EP | 1 039 715 A1 | 9/2000 |
| EP | 1 168 192 A2 | 1/2002 |
| EP | 1 612 980 A1 | 1/2006 |
| JP | 2000-278237 A | 10/2000 |
| JP | 2001-285032 A | 10/2001 |
| JP | 3457622 B2 | 8/2003 |
| JP | 2005-003623 A | 1/2005 |
| JP | 2005-150945 A | 6/2005 |
| JP | 2005-184725 A | 7/2005 |
| JP | 3793534 B2 | 4/2006 |
| JP | 4235043 B2 | 12/2008 |

OTHER PUBLICATIONS

Japanese Language Office Action dated Oct. 4, 2011.
Japanese Language Office Action dated Sep. 27, 2009.
Office Action of counterpart Chinese Patent Application No. 200780051831.X.
European Search Report, European Patent Applicaiton 0776877.7 dated Jan. 28, 2014.
Muneo Konishi et al, "A Frame Timing and Carrier Frequency Synchronization Scheme for OFDM Using Frequency-Shifted Signal", Electronics and Communications in Japan, Part 1, Oct. 1, 2002, vol. 85, No. 10, pp. 74-83.

* cited by examiner

*Primary Examiner* — Lihong Yu
(74) *Attorney, Agent, or Firm* — Arent Fox LLP

(57) ABSTRACT

A local carrier wave output from a synthesizer to quadrature demodulators is multiplied by an offset that makes a frequency shift by an integer number of subcarriers in units of sub-carrier bands. The offset is set to a value obtained by multiplying the number sequentially counted up from 0 to the number of unused sub-carriers included in guard tones in a signal band by the bandwidth of a sub-carrier. By shifting the frequency of the local carrier wave at the time of quadrature demodulation with the offset, the SNR of a baseband signal is prevented from being constantly degraded by a frequency characteristic possessed by the circuit of a receiver in a particular sub-carrier signal. Especially, by preventing a pilot signal from being constantly degraded, the signal can be received with higher accuracy.

7 Claims, 6 Drawing Sheets

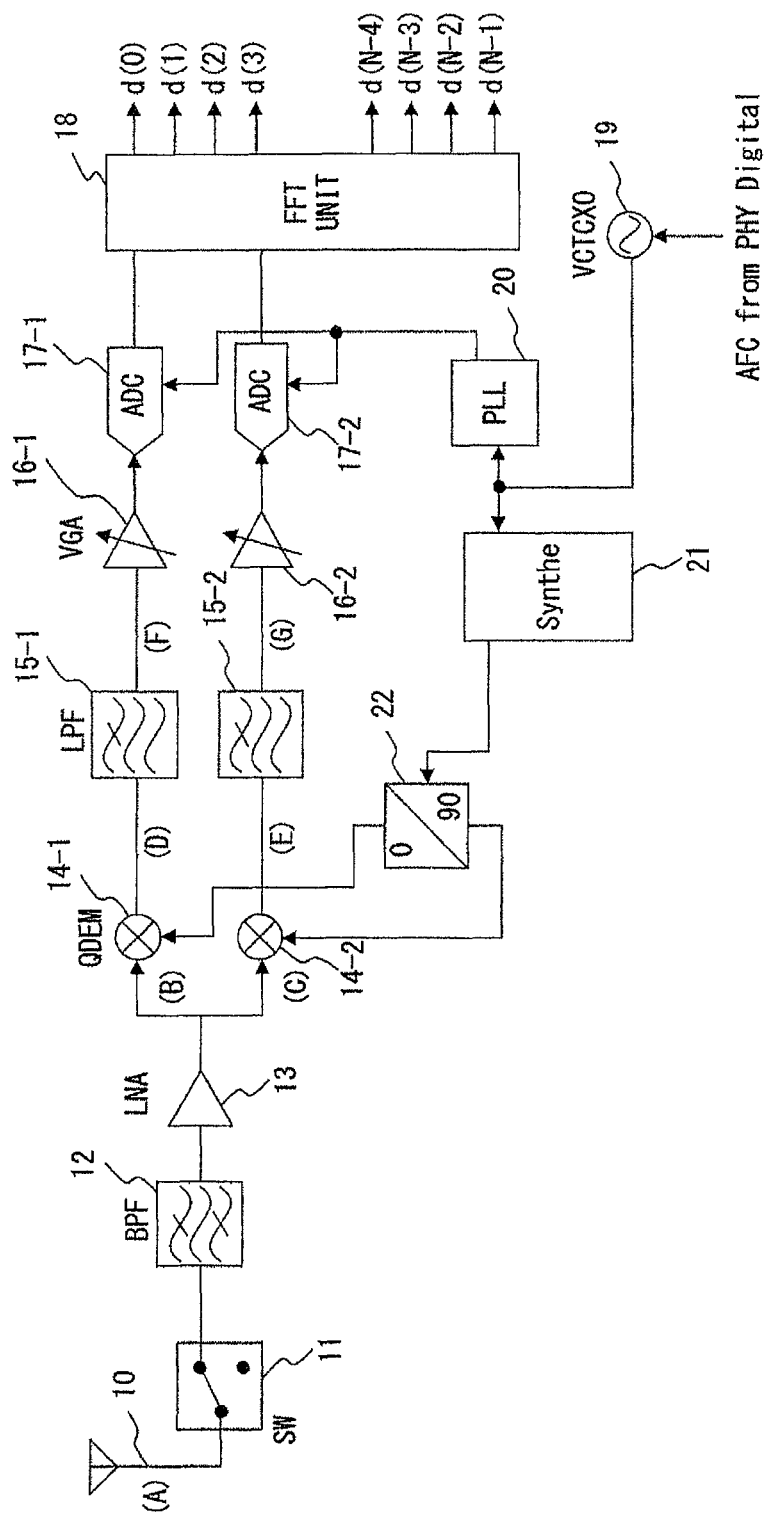
F I G. 1

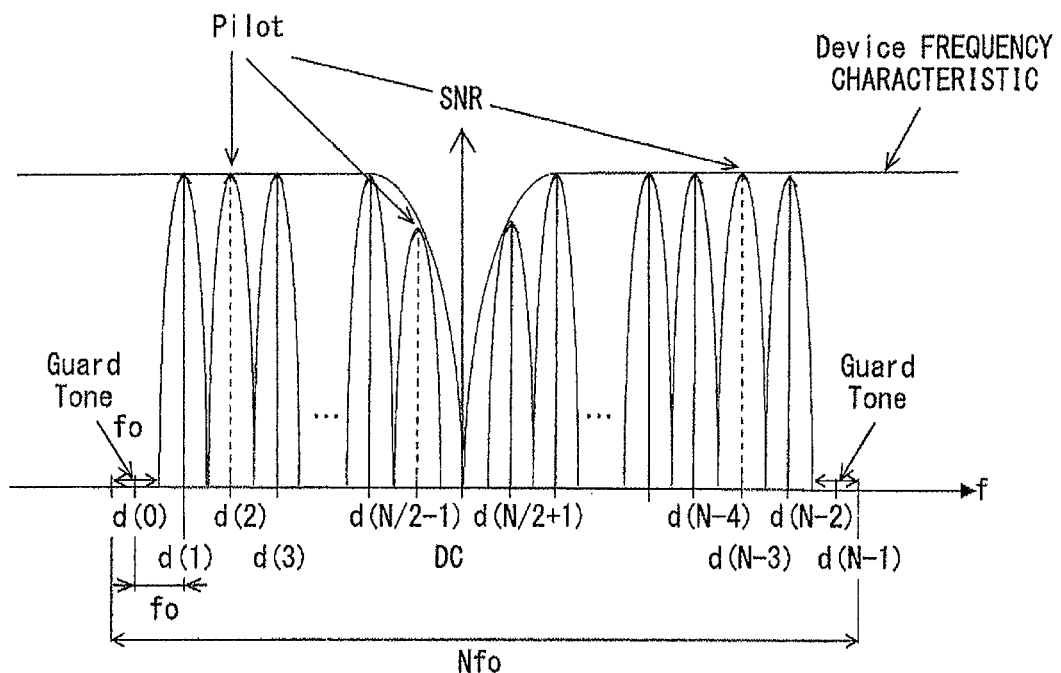
F I G. 3

MULTI-CARRIER COMMUNICATION APPARATUS

CROSS-REFERENCED TO RELATED APPLICATION

This application is a Divisional Application of U.S patent application Ser. No. 12/554,201, filed Sep. 4, 2009, which is a Continuation of National Stage entry of International Application PCT/JP2007/000218, filed Mar. 13, 2007, the disclosure of the prior applications being incorporated in their entirety by reference.

TECHNICAL FIELD

The present application relates to a multi-carrier communication apparatus in a multi-carrier communication system using a broad communication band.

BACKGROUND ART

In a multi-carrier communication using a plurality of carrier waves, a broad and stable frequency characteristic including a DC component is demanded for a transmitter/receiver. Additionally, the demand for a broad effective band and a narrow sub-carrier interval has been increasing in recent systems in order to implement a high data throughput. To meet such demands, a filter, an RF element, etc., which are included in a signal system, must be implemented at a stable frequency characteristic.

If measures for suppressing frequency distortion in a filter, etc. are taken, power consumption generally increases. Moreover, an element must be manufactured with a semiconductor process using SiGe, etc., of a high unit price in order to suppress 1/f noise in the vicinity of DC, leading to an increase in the cost of the system.

FIG. 1 illustrates a receiver for a multi-carrier communication according to conventional technology.

A carrier wave band reception signal that is received by an antenna 10 passes through a transmission/reception switch 11, a carrier wave bandpass filter 12, and a low noise amplifier 13. Then, the frequency of the reception signal is converted by being multiplied in quadrature demodulators 14-1 and 14-2 by local carrier waves that are generated by adjusting the frequency of the output of a local oscillator 19 with a synthesizer 21 and are implemented as a 0° phase wave and a 90° phase wave with a phase shifter 22. Moreover, the output of the local oscillator 19 is generated as a clock signal that is frequency-adjusted by a PLL (Phase Locked Loop) 20, and given to AD converters 17-1 and 17-2. The clock signal is used as a sampling signal in the AD converters 17-1 and 17-2. As the frequency of the clock signal, a frequency double the band of a baseband signal is used. Thereafter, the signals pass through lowpass filters 15-1 and 15-2, and baseband signals are extracted. Their relations are expressed with the following equations. Alphabets enclosed with parentheses respectively indicate a signal passing through a corresponding portion.

carrier wave band reception signal received by the antenna 10 (signal in a portion of (A))

[mathematical expression 1]

$$s(t) = \sum_{n=0}^{N-1} [a_n \cos\{2\pi(f_c + nf_0)t\} - b_n \sin\{2\pi(f_c + nf_0)t\}]$$

where:
$a_n = A_n \cos\theta_n$: InPhase component
$b_n = A_n \sin\theta_n$: QuadraturePhase component
N: Number of: MultiCariier
local carrier waves generated by the synthesizer 21

[Mathematical Expression 2]
I-Branch Local Carrier Wave $$(B) = \cos(2\pi f_c t)$$

Q-Branch Local Carrier Wave $$(C) = \cos(2\pi f_c t - \pi/2) = \sin(2\pi f_c t)$$

reception signals the frequency of which is converted by the quadrature demodulators 14-1 and 14-2

[Mathematical Expression 3]
(D) I-Branch Reception Signal $$S_I(t) = s(t)\cos(2\pi f_c t)$$
$$= \sum_{n=0}^{N-1} [a_n \cos\{2\pi(f_c + nf_0)t\}\cos(2\pi f_c t) - b_n \sin\{2\pi(f_c + nf_0)t\}\cos(2\pi f_c t)]$$
$$= \frac{1}{2}\sum_{n=0}^{N-1} [a_n \cos(2\pi nf_0 t) - b_n \sin(2\pi nf_0 t)] +$$
$$\frac{1}{2}\sum_{n=0}^{N-1} [a_n \cos(4\pi f_c t + 2\pi nf_0 t) - b_n \sin(4\pi f_c t + 2\pi nf_0 t)]$$

(E) Q-Branch Reception Signal $$S_Q(t) = s(t)\{-\sin(2\pi f_c t)\}$$
$$= \sum_{n=0}^{N-1} [a_n \cos\{2\pi(f_c + nf_0)t\}\{-\sin(2\pi f_c t)\} - b_n \sin\{2\pi(f_c + nf_0)t\}\{-\sin(2\pi f_c t)\}]$$
$$= \frac{1}{2}\sum_{n=0}^{N-1} [a_n \sin(2\pi nf_0 t) - b_n \cos(2\pi nf_0 t)] -$$
$$\frac{1}{2}\sum_{n=0}^{N-1} [a_n \sin(4\pi f_c t + 2\pi nf_0 t) - b_n \cos(4\pi f_c t + 2\pi nf_0 t)]$$

baseband signals after passing through the lowpass filters 15-1 and 15-2

[Mathematical Expression 4]
(F) I-Branch Baseband Reception Signal $$\tilde{s}_I(t) = \frac{1}{2}\sum_{n=0}^{N-1} [a_n \cos(2\pi nf_0 t) - b_n \sin(2\pi nf_0 t)] \quad (1\text{-}1)$$
$$= \frac{1}{2}\sum_{n=0}^{N-1} [A_n \cos(2\pi nf_0 t + \theta_n)]$$

where:

$a_n = A_n \cos\theta_n$ $b_n = A_n \sin\theta_n$ (G) Q-Branch Baseband Reception Signal $$\tilde{s}_Q(t) = \frac{1}{2}\sum_{n=0}^{N-1}[a_n\sin(2\pi n f_0 t) - b_n\cos(2\pi n f_0 t)] \quad (1\text{-}2)$$

$$= \frac{1}{2}\sum_{n=0}^{N-1}[A_n\sin(2\pi n f_0 t + \theta_n)]$$

where:

$a_n = A_n \cos\theta_n$ $b_n = A_n \sin\theta_n$

The baseband signals converted from the multi-carrier signal pass through variable gain amplifiers 16-1 and 16-2, are sampled by the AD converters 17-1 and 17-2, and converted into information for respective sub-carriers by an FFT unit 18. d(0) to d(N−1): {d(n)=$a_n$+j$b_n$} at the right of FIG. 1 represent the reception signals of the respective sub-carriers. N is the number of sub-carriers used, and the similar to the size of the FFT.

FIG. 2 illustrates the spectrum of the multi-carrier communication reception signal received by the antenna 10.

The sub-carriers are allocated at the frequency interval of fo[Hz], centering on the frequency of the carrier wave fc[Hz]. If N sub-carriers are used, the frequency band of the entire multi-carrier signal is Nfo[Hz] d(0) to d(N−1) of FIG. 2 correspond to those of FIG. 1, and represent the symbols of the respective sub-carriers. d(0) and d(N−1) are unused sub-carriers called guard tones, and provided to prevent adjacent channels from being impeded. Here, the number of sub-carriers of the guard tones on both sides is two. However, guard tones the number of which is approximately two-tenth of the total number of sub-carriers are used in an actual system. For example, if there are 100 sub-carriers, the total of 20 sub-carriers are defined as being unused on both sides of the signal band.

In FIG. 2, d(2), d(N/2−1), d(N−3), etc. are known reference signals that are called pilot symbols and intended to detect synchronization. For the pilot symbols, a sub-carrier the frequency of which is the similar to the carrier wave frequency fc[Hz] is not used in normal cases. The reason is as follows: when being converted into a baseband signal, the carrier wave frequency fc becomes a DC component, on which 1/f noise is superimposed, an SNR therefore becomes small, and a signal error tends to occur despite the existence of a pilot symbol.

FIG. 3 illustrates the spectrum of the reception signal when a frequency characteristic exists in the receiver.

The example of FIG. 3 illustrates an influence exerted by 1/f noise existing in the vicinity of DC after the reception signal is frequency-converted into a baseband signal. The 1/F noise occurs in the quadrature demodulators 14-1, 14-2, etc. illustrated in FIG. 1. Additionally, a frequency characteristic, or the like, which degrades the signal power, can possibly exist in the vicinity of a particular frequency. In the case illustrated in FIG. 3, the symbols of d(N/2−1) and d(N/2+1) are degraded by the influence of the 1/f noise.

For data sub-carriers and the frequency selective fading of a transmission channel, there are effective measures such as a frequency interleaver, etc. With the frequency interleaver, not sub-carriers of a fixed frequency but sub-carriers of different frequencies are used when the data symbols of one sequence are respectively transmitted. However, for a synchronization detection method using a continuous pilot sub-carrier to which a particular frequency is allocated to transmit a pilot symbol, there are no effective measures although a high SNR is demanded for the pilot symbol. Also a scattered pilot sub-carrier, to which a temporally different frequency is allocated to transmit a pilot symbol, causes a similar problem if degradation is caused by a frequency characteristic in a range where the frequency of the pilot symbol changes.

SUMMARY

According to an aspect of the embodiments, a multi-carrier communication apparatus transmitting/receiving a signal including a plurality of sub-carriers includes a local carrier wave generating unit for generating a local carrier wave for demodulation; an offset adding unit for adding to the local carrier wave a frequency offset of a constant multiple of a frequency interval of a sub-carrier; and an offset varying unit for cyclically varying the constant of the offset. In this apparatus, the signal is demodulated by using the local carrier wave to which the frequency offset is added.

The object and advantages of the invention will be realized and attained by means of the elements and combinations articularly pointed out in the claims.

It is to be understood that both the foregoing general description and the following detailed description are exemplary and explanatory and are not restrictive of the invention, as claimed

BRIEF DESCRIPTION OF DRAWINGS

FIG. 1 illustrates a receiver for a multi-carrier communication in conventional technology;

FIG. 3 illustrates the spectrum of a reception signal when a frequency characteristic exists in a communication device;

DESCRIPTION OF EMBODIMENTS

In an embodiment, the band of a baseband signal after being frequency-converted is shifted by cyclically varying the frequency of a local carrier wave used for down conversion performed in a mixer, etc. with an integer multiple of the frequency interval of a multi-carrier for each OFDM symbol, if an SNR is degraded by a particular frequency including DC (frequency 0) due to a circuit characteristic. By shifting the band, the frequency of a signal, which degrades the SNR, is converted to another frequency that does not degrade the SNR. As a result, the influence exerted by the degradation may be prevented from concentrating on a particular sub-carrier.

In a normal multi-carrier communication system, both ends of an allocated frequency band are not used as guard tones. For example, in the specifications of a WiMAX system, an effective band is 11.2 MHz×(841/1024)=9.19 MHz in the band of 11.2 MHz. In this case, an unused band of 995 KHz of 91 sub-carriers exists at both ends of the band.

Accordingly, it is not difficult in the system to add an offset of the maximum of the guard tone band to the frequency of a local carrier wave. However, adding the offset drifts the allocation of sub-carriers in the baseband. This drift is an integer multiple of the frequency interval of the multi-carrier. Therefore, in the embodiment, the drift is cancelled by correcting a sub-carrier index, and the signal is received as if it were received at a fixed local frequency.

Figure 2:
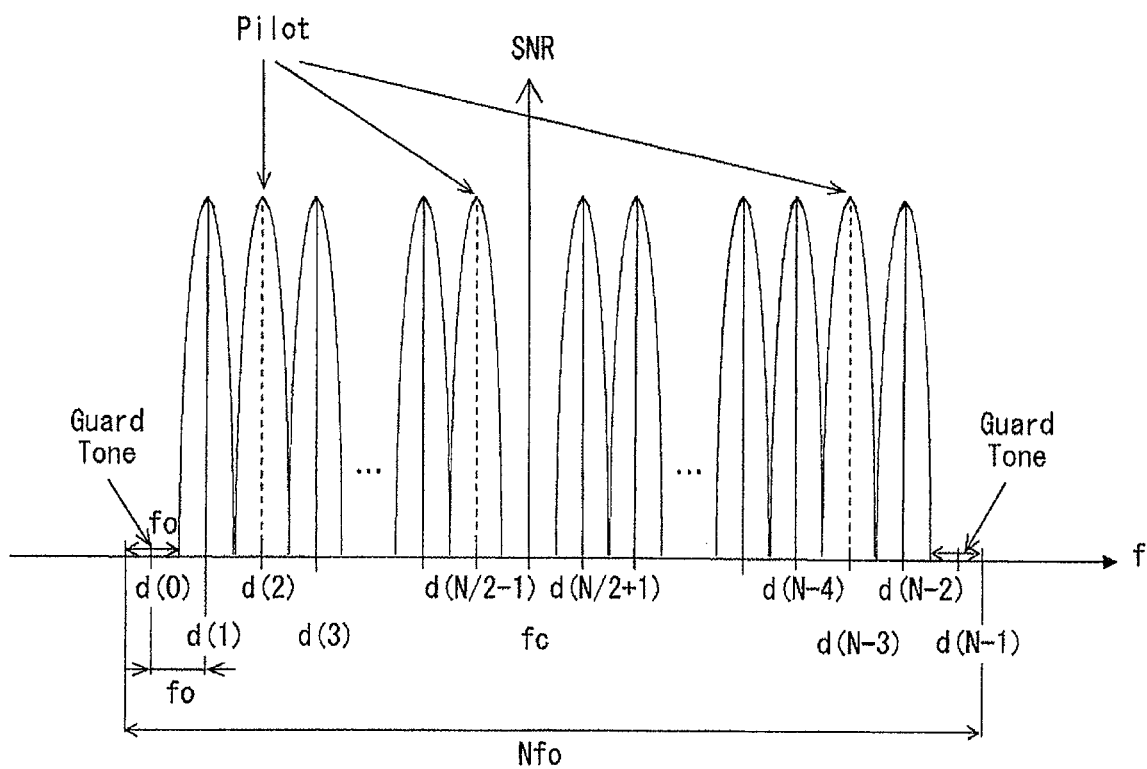
FIG. 2 illustrates the spectrum of a multi-carrier communication reception signal received by an antenna.
Figure 4:
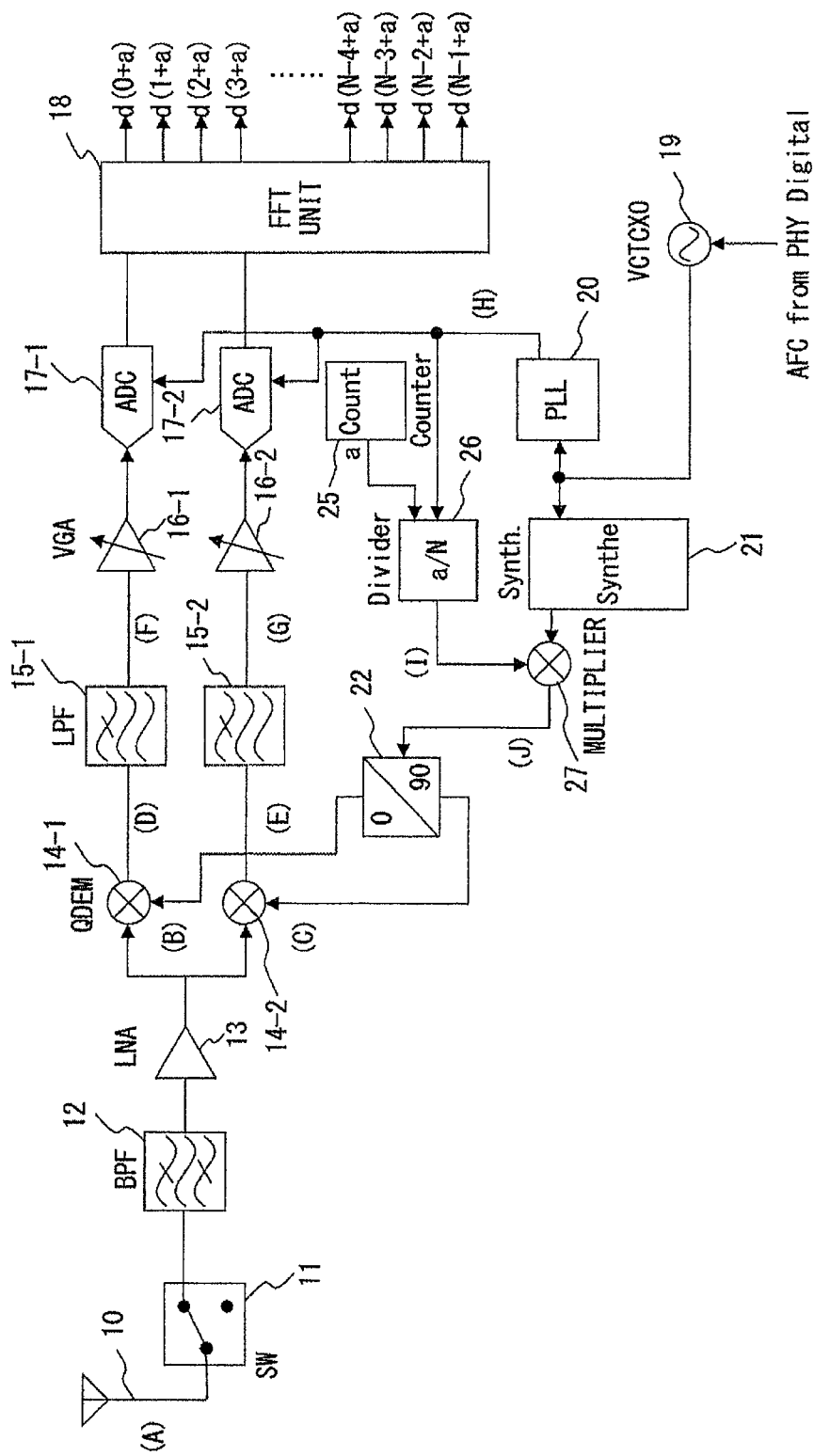
FIG. 4 is a first configuration example of a multi-carrier receiver according to an embodiment.

FIG. 4 is a first configuration example of a multi-carrier receiver according to the embodiment.

In FIG. 4, the same components as those of FIG. 1 are denoted with the same reference numerals, and their descriptions are omitted. This configuration is implemented by adding a divider 26, a multiplier 27 and a counter 25 to the conventional receiver illustrated in FIG. 1. In this configuration, the signal is multiplied by an integer multiple a (namely, an offset) of a sub-carrier frequency (the local carrier wave that is the output of the synthesizer 21) (the signal after being multiplied by the offset is a signal of (J)). Here, a is an offset control signal that cyclically vairies for each OFDM symbol, and may be obtained as the output of the counter 25. For example, if an unused portion of 91 sub-carriers exists, the counter 25 executes, for example, a process for cyclically counting up the value of a from 0 to 91. Here, the output frequency Nfo (a signal of (H) in this figure) of a PLL 20 ($\cos(2\pi N f_o t)$) is used for the AD converters 17-1 and 17-2. Namely, this is a doubled frequency of the central frequency of the signal band to the frequency at the end of the signal band, and is the same frequency ($Nf_o$) as the band of the entire signal band. In the meantime, this becomes a frequency ($f_o$) equivalent to the band width of one sub-carrier if it is divided by the number of sub-carriers N. Additionally, the frequency becomes an offset that shifts sub-carriers by the value of a ($af_o$). Accordingly, multiplying the output frequency of the PLL 20 by a/N generates a frequency offset ($af_o$) that shifts sub-carriers by the value of a. As a result, $I=\cos(2\pi af_o t)$ may be obtained, and the signal of (J) represented by a mathematical expression 7 may be obtained by being multiplied by $\cos(2\pi f_o t)$ of the synthesizer 21.

FIGS. 5A and 5B illustrate a change in the spectrum of the reception signal, which is made by executing the above described process in the embodiment. In these figures, the horizontal and the vertical axes represent a frequency and an SNR, respectively. In FIGS. 5A and 5B, one guard tone is respectively provided for one sub-carrier at both sides of the signal band (portions of d(0) and d(N−1)). Moreover, since the band is not shifted in FIG. 5A, 1/f noise is superimposed on the DC portion. Therefore, the SNR decreases (the portion where the device frequency characteristic drops), and one SNR of the pilot signal at d(N/2−1) decreases. In the embodiment, the baseband is shifted by shifting the frequency of a local carrier wave by $af_o$ (a=1 here) as illustrated in FIG. 5B. Therefore, the entire signal band moves by $f_o$, and the SNR of the pilot signal at d(N/2−1) is not degraded any more. In the meantime, the portion of the signal degradation becomes closer to the sub-carrier signal at d(N/2+1) by the shift of the signal band. Therefore, the SNR of the signal at d(N/2+1) decreases, and is degraded. In the case of FIG. 5B, the pilot signal is prevented from being degraded if it is left unchanged. Actually, however, a pilot signal of a smaller SNR may newly occur due to the existence of the frequency characteristic in another portion in the state where the local carrier wave is shifted. Accordingly, in the embodiment, the amount of shift of the local carrier wave is sequentially varied, and the state where the local carrier wave is shifted, and the state where the local carrier wave is not shifted are cyclically repeated. In the case of FIG. 5B, a=1. Therefore, cyclically repeating the amount of shift means that the case where the amount of shift is 0, and the case where the amount of shift is $f_o$ are alternately repeated. Accordingly, the state where the local carrier wave is not shifted as illustrated in FIG. 5A and the pilot signal at d(N/2−1) is degraded, and the state where the local carrier wave is shifted by $f_o$ as illustrated in FIG. 5B are repeated. Relations of the signals are represented with the following equations. Alphabets enclosed with parentheses respectively represent a signal passing through a corresponding portion in a similar manner as in FIG. 1.

the output of the PLL 20
[Mathematical Expression 5]

$$(H) = \cos(2\pi N f_o t)$$

where:
N: number of multi-carriers
$f_o$: frequency interval of multi-carrier
the output of the divider 26
[Mathematical Expression 6]

$$(I) = \cos(2\pi a f_o t)$$

where:
a={0, 1, 2, . . . (Max absolute value=number of Guard Tone)}: SubCarrier offset
the output of the multiplier 27
[Mathematical Expression 7]

$$(J) = \cos(2\pi f_c t)\cos(2\pi a f_0 t) - \sin(2\pi f_c t)\sin(2\pi a f_0 t)$$
$$= \cos\{2\pi (f_c + a f_0) t\}$$

offset local carrier wave
[Mathematical Expression 8]
I-Branch Local Carrier Wave $$(B) = \cos\{2\pi (f_c + a f_0) t\}$$

Q-Branch Local Carrier Wave $$(C) = \cos\{2\pi (f + a f_0) t - \pi/2\} = \sin\{2\pi (f + a f_0) t\}$$

reception signals the frequency of which is converted by the quadrature demodulators 14-1 and 14-2
[Mathematical Expression 9]
(D) I-Branch Reception Signal $$S_I(t) = s(t)\cos\{2\pi (f_c + a f_0) t\}$$
$$= \sum_{n=0}^{N-1} [a_n \cos\{2\pi (f_c + n f_0) t\}\cos\{2\pi (f_c + a f_0) t\} - b_n \sin\{2\pi (f_c + n f_0) t\}\cos\{2\pi (f_c + a f_0) t\}]$$
$$= \frac{1}{2}\sum_{n=0}^{N-1} [a_n \cos\{2\pi (n - a) f_0 t\} - b_n \sin\{2\pi (n - a) f_0 t\}] + \frac{1}{2}\sum_{n=0}^{N-1} [a_n \cos\{4\pi f_c t + 2\pi (n + a) f_0 t\} - b_n \sin(4\pi f_c t + 2\pi (n + a) f_0 t)]$$

(E) Q-Branch Reception Signal $$S_Q(t) = s(t)\{-\sin\{2\pi (f_c + a f_0) t\}\}$$
$$= \sum_{n=0}^{N-1} [a_n \cos\{2\pi (f_c + n f_0) t\}\{-\sin\{2\pi (f_c + a f_0) t\}\} - b_n \sin\{2\pi (f_c + n f_0) t\}\{-\sin\{2\pi (f_c + a f_0) t\}\}]$$

-continued $$= \frac{1}{2}\sum_{n=0}^{N-1}[a_n\sin\{2\pi(n-a)f_0t\} - b_n\cos\{2\pi(n-a)f_0t\}] -$$

$$\frac{1}{2}\sum_{n=0}^{N-1}[a_n\sin\{4\pi f_c t + 2\pi(n+a)f_0t\} -$$

$$b_n\cos\{4\pi f_c t + 2\pi(n+a)f_0t\}]$$

baseband signals after passing through the lowpass filters 15-1 and 15-2
[Mathematical Expression 10]
(F) I-Branch Baseband Reception Signal $$\tilde{s}_I(t) = \frac{1}{2}\sum_{n=0}^{N-1}[a_n\cos\{2\pi(n-a)f_0t\} - b_n\sin\{2\pi(n-a)f_0t\}]$$

$$= \frac{1}{2}\sum_{n=0}^{N-1}[A_n\cos(2\pi(n-a)f_0t + \theta_n)]$$

where:

$a_n = A_n \cos\theta_n$ $b_n = A_n \sin\theta_n$ (G) Q-Branch Baseband Reception Signal $$\tilde{s}_Q(t) = \frac{1}{2}\sum_{n=0}^{N-1}[a_n\sin\{2\pi(n-a)f_0t\} - b_n\cos\{2\pi(n-a)f_0t\}]$$

$$= \frac{1}{2}\sum_{n=0}^{N-1}[A_n\sin(2\pi(n-a)f_0t + \theta_n)]$$

where:

$a_n = A_n \cos\theta_n$ $b_n = A_n \sin\theta_n$

Figure 5:
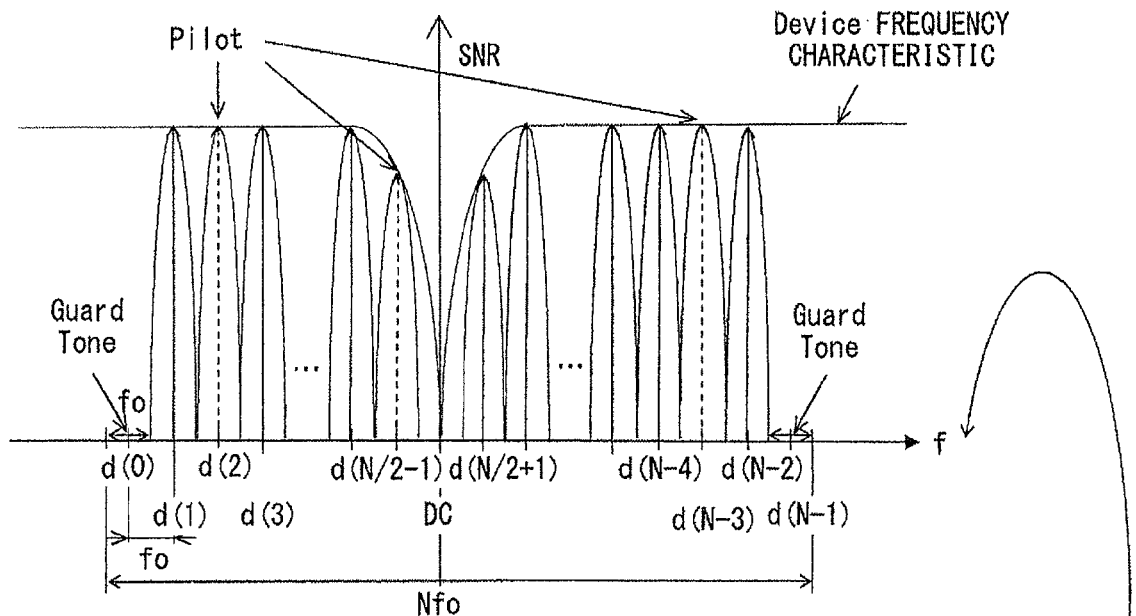
FIG. 5 illustrates a change in the spectrum of a reception signal, which is made by executing a process according to the embodiment.
Figure 5:
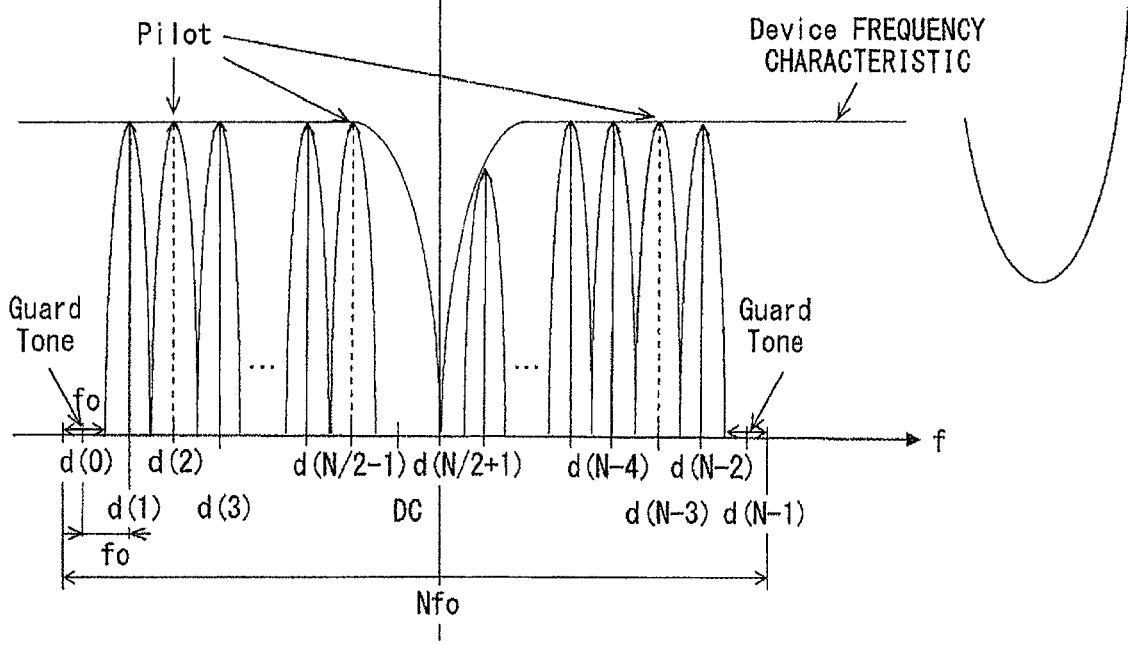

In the example of FIG. 5, the maximum value of the sub-carrier offset a is the number of guard tones 1 at one side. As a result, a cyclically takes the value of 0 to 1 to 0 to 1 ... every OFDM symbol. The basband signals after passing through the lowpass filters 15-1 and 15-2 in the case of a=1 in FIG. 5 are represented with the following equations.

baseband signals after passing through the lowpass filters 15-1 and 15-2
[Mathematical Expression 11]
(F) I-Branch Baseband Reception Signal $$\tilde{s}_I(t) = \frac{1}{2}\sum_{n=0}^{N-1}[a_n\cos\{2\pi(n-1)f_0t\} - b_n\sin\{2\pi(n-1)f_0t\}] \quad (2\text{-}1)$$

$$= \frac{1}{2}\sum_{n=0}^{N-1}[A_n\cos(2\pi(n-1)f_0t + \theta_n)]$$

where:

$a_n = A_n \cos\theta_n$ $b_n = A_n \sin\theta_n$ (G) Q-Branch Baseband Reception Signal $$\tilde{s}_Q(t) = \frac{1}{2}\sum_{n=0}^{N-1}[a_n\sin\{2\pi(n-1)f_0t\} - b_n\cos\{2\pi(n-1)f_0t\}] \quad (2\text{-}2)$$

$$= \frac{1}{2}\sum_{n=0}^{N-1}[A_n\sin(2\pi(n-1)f_0t + \theta_n)]$$

where:

$a_n = A_n \cos\theta_n$ $b_n = A_n \sin\theta_n$

The equation 2-1 that represents the I-Branch baseband reception signal, and the equation 2-2 that represents the Q-Branch baseband reception signal respectively correspond to the equations 1-1 and 1-2 that represent the signals to which an offset is not added. Whether or not an offset exists is determined by whether the symbol information $A_n$, $\theta_n$ for each sub-carrier is extracted either as the frequency component of $2\pi nf_0 t$ or as the frequency component of $2\pi(n-1)f_0 t$ (a=1 here). This may be corrected by adding an offset of +1, namely, d(0+1)=d(1) to d(N-1+1)=d(N) to the frequency component outputs d(0) to d(N-1): {d(n)=$a_n$+j$b_n$} after being processed by the FFT unit. By adding the offset of +1, the frequency components start to be extracted not at d(0) but at d(1). However, since d(0) is originally unused as a guard tone, it does not matter.

In the case of a=1 illustrated in FIG. 5, the pilot sub-carrier {d(N/2−1)} influenced by SNR degradation before being processed is not influenced any longer, and the data sub-carrier {d(N/2+1)} is influenced by the degradation in turn. However, the influence of the SNR degradation is scattered with the effects of frequency interleaving and an error correction according to conventional technology.

Figure 6:
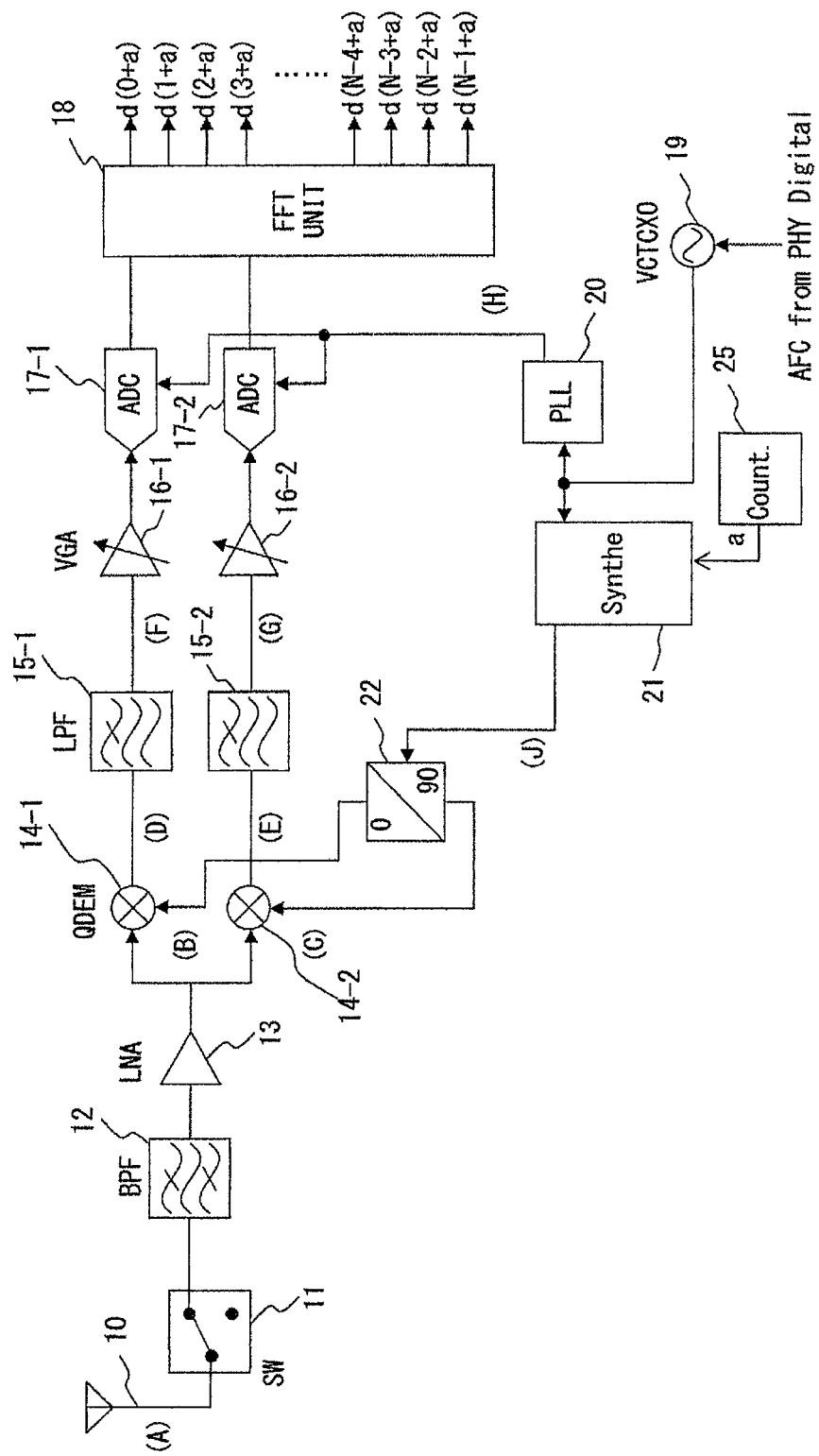
FIG. 6 is a second configuration example of the multi-carrier receiver according to the embodiment.

FIG. 6 is a second configuration example of the multi-carrier receiver according to the embodiment.

In FIG. 6, the same components as those of FIG. 4 are denoted with the same reference numerals, and their descriptions are omitted.

In the above described example of FIG. 4, the output of the synthesizer 21 is multiplied by the output of the divider 26 in order to obtain an offset local carrier wave. There is also a method for adding an offset by controlling the output frequency itself of the synthesizer 21. The configuration illustrated in FIG. 6 is implemented by removing the divider 26 and the multiplier 27 from the configuration of FIG. 4, and by adding the input of the offset control signal a to the synthesizer 21 instead. Here, the value that the counter 25 gives to the synthesizer 21 is the similar to the above described value. The synthesizer 21 multiplies a by the bandwidth (interval) of a sub-carrier preset within the synthesizer 21, and multiplies the local carrier wave by the offset. In this case, the offset local carrier wave represented below may be obtained as the output of the synthesizer 21.

offset local carrier wave
[Mathematical Expression 12]
I-Branch Local Carrier Wave $(B) = \cos\{2\pi(f_c + af_0)t\}$ Q-Branch Local Carrier Wave $(C) = \cos\{2\pi(f_c + af_0)t - \pi/2\} = \sin\{2\pi(f_c + af_0)t\}$ According to the above described embodiment, an influence of degradation caused by a frequency characteristic specific to a communication device on a pilot sub-carrier, the position of which may not be changed on a frequency axis, may be reduced with an offset cyclically added to a local carrier wave. At this time, the probability that the pilot sub-carrier allocated at a particular frequency is influenced by the degradation depends on the cycle of the offset added.

Accordingly, the SNR may be improved as follows as a communication system without using a special process such as SiGe, etc. while using an element having a frequency characteristic that consumes less power and has an un satisfactory frequency characteristic.

To which extent the SNR is improved according to the embodiment is described below.

As is known, a conventional relation between a frequency characteristic and the $CNR_n$ (Carrier to Noise Ratio) of each sub-carrier is given by the following equation.

[mathematical expression 13]

$$CNR_n = CNR_A \times \frac{1}{1 + 1/SNR_f} \times \frac{N_{subchan}}{(N_{subchan} - N_{pilot}) + N_{pilot} \times SNR} \quad (3\text{-}1)$$

where $CNR_A$: CNR in total band $SNR_f$: degradation ratio of frequency characteristic to pilot sub-carrier $N_{subchan}$: repetitive number of sub-carriers into which pilot symbol is inserted $N_{pilot}$: number of pilot sub-carriers per $N_{subchan}$ The relation after the CNR is improved according to the embodiment is given by the following equation.

[mathematical expression 14]

$$CNR_n = CNR_A \times \frac{1}{1 + 1/(SNR_f/b)} \times \frac{N_{subchan}}{(N_{subchan} - N_{pilot}) + N_{pilot} \times (SNR_f/b)}$$

where b: repetitive cycle of L0 frequency offset of a/N

Here, $SNR_f$ is one-bth. This results from the findings that the SNR is degraded only once among b offset changes in the repetitive cycle of the offset since degradation is not caused by shifting the frequency of a pilot signal.

The above described embodiment refers to the configurations where a frequency offset is added to a local carrier wave on the side of the receiver. However, a frequency offset may be directly added to a carrier wave of a transmission signal on the side of a transmitter, and the signal may be demodulated on the side of the receiver. In this case, a baseband signal after being demodulated is obtained with a frequency offset added. Therefore, the baseband signal is processed by being given an offset that cancels the offset on the transmission side to an extracted frequency component after being processed by the FFT unit. This method for canceling the offset may be the similar to the method described with reference to FIG. 5.

According to aforementioned embodiments, a multi-carrier communication apparatus that receives a pilot signal with less errors is provided.

According to aforementioned embodiments, an SNR of a particular frequency component of an obtained baseband signal may be prevented from being constantly degraded by a frequency characteristic by adding an offset to a local carrier wave at the time of demodulation and by varying the offset, even if the SNR of the particular frequency component is degraded by the frequency characteristic of an element within a receiving device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) has (have) been described in detail, it should be understood that the various changes, substitutions, and alterations could be made hereto without departing from the spirit and scope of the invention.

What is claimed is:

1. A multi-carrier communication system configured to transmit or receive a signal including a plurality of sub-carriers, the system comprising:
   a transmitter comprising:
      a transmission signal offset adding unit configured to:
         add a frequency offset of a constant multiple of a frequency interval of a sub-carrier to a carrier wave of a transmission signal including a plurality of sub-carriers by multiplying the carrier wave by a cyclical wave having a frequency of the frequency offset, and
         cyclically vary the constant multiple of the frequency offset; and
   a receiver comprising:
      a demodulating unit configured to demodulate a signal from the transmitter, and
      an offset canceling unit configured to convert the demodulated signal into frequency components, to add an offset to each of the frequency components, the offset canceling the frequency offset added by the transmitter, and to output the signal.

2. The multi-carrier communication system according to claim 1, wherein the transmitter further comprises a modulating unit configured to modulate the transmission signal by using the carrier wave to which the frequency offset is added.

3. The multi-carrier communication system according to claim 2, wherein the transmission signal offset adding unit is further configured to cyclically count up from 0 to a maximum value by using a number of unused sub-carriers as the maximum value, wherein the unused sub-carriers are among the plurality of sub-carriers included in a signal band of a multi-carrier signal and are not used for transmitting or receiving the signal.

4. The multi-carrier communication system according to claim 2, wherein the transmission signal offset adding unit is further configured to obtain the frequency interval of the sub-carrier by dividing a frequency of a clock signal used to digitize a baseband signal by a number of sub-carriers included in a signal band of a multi-carrier signal, and to generate the frequency offset by multiplying the frequency interval of the sub-carrier by the constant multiple.

5. The multi-carrier communication system according to claim 4, wherein the frequency of the clock signal is similar to the signal band of the multi-carrier signal.

6. The multi-carrier communication system according to claim 1, wherein a pilot signal is transmitted with a fixed sub-carrier in a multi-carrier communication.

7. The multi-carrier communication system according to claim 1, wherein a sub-carrier used to transmit a pilot signal is configured to vary with time in a multi-carrier communication.

* * * * *